Figure 1:
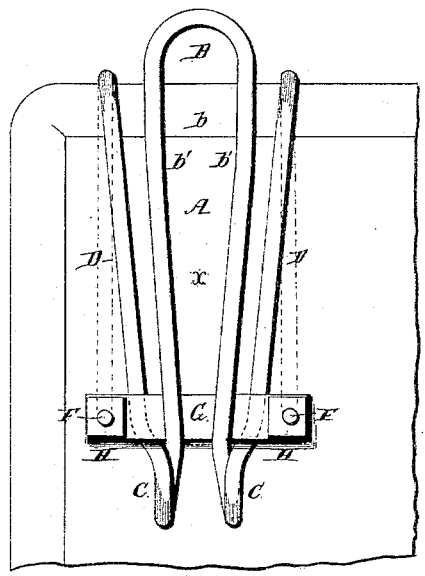

(No Model.)

W. E. BEISONHERT.
REIN HOLDER.

No. 381,608. Patented Apr. 24, 1888.

Witnesses.
Geo. Thope.
E. G. Giggs.

Inventor.
Wm. E. Beisonhert.
By his Attorneys,
C. A. Snow & Co.

N. PETERS, Photo-Lithographer, Washington, D. C.

United States Patent Office.

WILLIAM E. BEISONHERT, OF FORMOSA, ILLINOIS, ASSIGNOR OF ONE-HALF TO JAMES F. EDWARDS, OF SAME PLACE.

REIN-HOLDER.

SPECIFICATION forming part of Letters Patent No. 381,608, dated April 24, 1888.

Application filed January 25, 1888. Serial No. 261,859. (No model.)

*To all whom it may concern:*

Be it known that I, WILLIAM E. BEISONHERT, a citizen of the United States, residing at Formosa, in the county of Madison and State of Illinois, have invented new and useful Improvements in Rein-Holders, of which the following is a specification.

The invention relates to improvements in rein-holders, the object being to produce a device of this character that will be cheap, simple, and effective; and it consists in the construction and novel combination of parts, hereinafter described, illustrated in the drawings, and pointed out in the appended claims.

Figure 2:
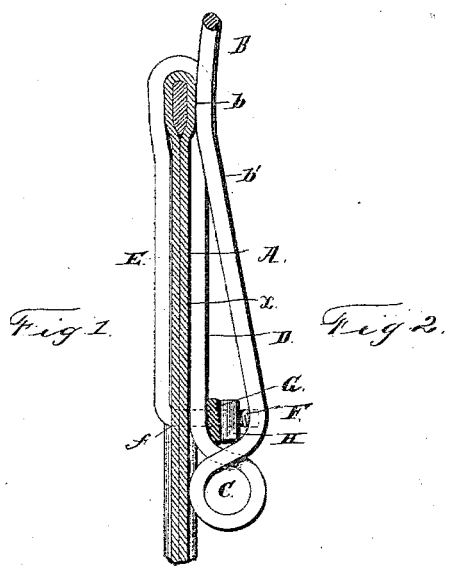
Figure 3:
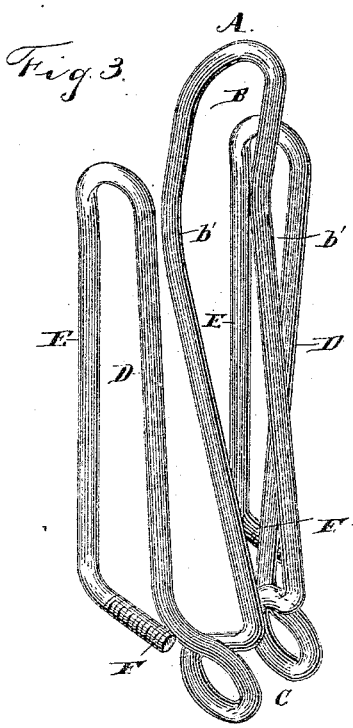

In the drawings, Figure 1 is a front view of the device attached to the dash-board of a vehicle. Fig. 2 is a longitudinal vertical sectional view of the same. Fig. 3 is a view of the device detached.

Referring to the drawings by letter, A designates the device made principally of strong brass wire, as shown. The said wire is in a single piece and is bent centrally to form the curved tongue B, which touches the surface of the vehicle at a point, $b$, above the attachment of the said tongue. The arms $b'$ $b'$ of the said tongue run downward from their central bent part and end in the coils C C on each side, which coils form the springs of the device.

D D are arms that extend upward on each side from the coils, and E E are similar arms extending downward from the ends of the arms D, on the opposite side of the dash-board X of the vehicle, to which the device is attached.

The arms D have their ends bent at about right angles, passed through openings $f$ in the side of the vehicle, and tapped at their ends.

G is a bar that lies against the arms D, and is provided with openings through which the arms F pass, and H H are nuts that engage the said arms outside the said bar.

It will be observed that the arms D E form a clasp to encircle the upper edge of the dash-board and pass down on opposite sides of the same.

The above-described device is attached to the side of a vehicle, with the tongue B upward, and is forced against the side of the vehicle by the spring-coils, so that the tongue will hold the reins when the latter are thrust between it and the side of the vehicle.

The device is simple, cheap, and effective, and is not liable to get out of repair. It will hold the reins firm, so that they will not get down under the horse's feet. The device can be attached to the dash-board of any vehicle.

Having described my invention, I claim—

1. The improved rein-holder consisting of the tongue B, the coils C, and the clamping-arms D E, adapted to pass over the top edge of the dash-board, the arms E having their lower ends securely fastened to the dash-board, as set forth.

2. The improved rein-holder comprising the tongue B, the coils C at the lower end of the tongue, the arms D, rising from said coils, the arms E, formed integral with the arms D and arranged parallel therewith, the said arms E having their lower ends bent at right angles and inserted transversely through the dash-board, the bar G, fitted on the said ends of the arms E, and the nuts H, turning on the said ends up against the bar G, as and for the purpose specified.

In testimony that I claim the foregoing as my own I have hereto affixed my signature in presence of two witnesses.

WILLIAM E. BEISONHERT.

Witnesses:
  I. B. BOSOMWORTH,
  JOHN E. WOOD.